(12) United States Patent
Shi et al.

(10) Patent No.: US 12,531,500 B2
(45) Date of Patent: Jan. 20, 2026

(54) LINEAR DRIVE DEVICE

(71) Applicant: AAC Technologies (Nanjing) Co., Ltd., Nanjing (CN)

(72) Inventors: Weiling Shi, Nanjing (CN); Xueyuan Zhu, Nanjing (CN); Shun Guo, Nanjing (CN); Lin Qian, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 287 days.

(21) Appl. No.: 18/321,787

(22) Filed: May 23, 2023

(65) Prior Publication Data

US 2024/0178779 A1 May 30, 2024

Related U.S. Application Data

(63) Continuation of application No. PCT/CN2022/144285, filed on Dec. 30, 2022.

(30) Foreign Application Priority Data

Nov. 30, 2022 (CN) .......................... 202223212207.4

(51) Int. Cl.
*H02P 25/064* (2016.01)
*H02K 41/03* (2006.01)

(52) U.S. Cl.
CPC ......... *H02P 25/064* (2016.02); *H02K 41/031* (2013.01)

(58) Field of Classification Search
CPC .......................... H02P 25/064; H02K 41/031
See application file for complete search history.

(56) References Cited

U.S. PATENT DOCUMENTS

| | | | |
|---|---|---|---|
| 2018/0090254 A1* | 3/2018 | Ozimek | H02P 5/00 |
| 2018/0262133 A1* | 9/2018 | Weber | G01D 5/145 |
| 2019/0089283 A1* | 3/2019 | Hamm | H02P 25/06 |
| 2020/0148240 A1* | 5/2020 | Desotelle | B61B 13/08 |

\* cited by examiner

*Primary Examiner* — Zoheb S Imtiaz
(74) *Attorney, Agent, or Firm* — Wiersch Law Group

(57) ABSTRACT

The present disclosure provides a linear drive device, which includes: a stator including a stator body and a plurality of coils. The linear drive device further includes a rotor including a rotor body supported on the stator body, and a magnetic steel fixed on the rotor body, a first position feedback unit fixed on the rotor body, and multiple drivers. The multiple coils arranged in series or parallel are electrically connected to one of the multiple drivers, while remaining coils not arranged in series or parallel are divided into multiple groups, and multiple coils in each of the multiple groups are electrically connected to the other driver. The linear drive device further includes a controller electrically connected to the multiple drivers. The linear drive device in the present disclosure not only saves the number of drivers, but also reduces the difficulty of controlling the entire control system.

6 Claims, 3 Drawing Sheets

A-A

B-B

LINEAR DRIVE DEVICE

CROSS REFERENCE TO RELATED APPLICATIONS

The present application is a continuation of PCT Patent Application No. PCT/CN2022/144285, entitled "LINEAR DRIVE DEVICE," filed Dec. 30, 2022, which claims priority to Chinese patent application No. 202223212207.4, entitled "LINEAR DRIVE DEVICE," filed Nov. 30, 2022, each of which is incorporated by reference herein in its entirety, which is incorporated herein by reference in its entirety.

TECHNICAL FIELD

The present disclosure relates to the technical field of linear drive, in particular to a linear drive device.

BACKGROUND

A linear drive device is a motion device used to drive a rotor to move in a straight line. The linear drive device mainly includes a stator composed of multiple coils, a rotor sliding connected to the stator and composed of magnetic steel, multiple drivers used to drive and control each of the multiple coils, and the multiple drivers connected to multiple drivers respectively.

In the liner drive device of the conventional art, some positions do not require other workstations, the multiple coils are only enabled to drive the rotor to move past the above positions, without the need for precise drive control and collaborative control.

However, in practical use, the linear drive device is provided with a driver for each coil, which leads to the waste of a large number of drivers for multiple coils without precise control, resulting in high cost of linear drive devices and difficulty in controlling the entire control system.

SUMMARY

The technical problem to be solved by the present disclosure is how to provide a linear drive device to solve the problem of waste of drivers caused by the linear drive device in the conventional art providing each coil with a driver, resulting in high cost and high control difficulty.

A linear drive device is provided according to the embodiments of the present disclosure, the linear drive device includes:
 a stator, wherein the stator comprises a stator body and a plurality of coils fixed to the stator body and arranged sequentially along an extending direction of the stator body, and at least a part of the plurality of coils are arranged in series or parallel;
 a rotor, wherein the rotor comprises a rotor body supported on the stator body and forming a sliding connection with the stator body, a magnetic steel fixed on the rotor body, and the magnetic steel is spaced from and arranged opposite to the coil;
 a first position feedback unit fixed on a side of the rotor body close to the stator;
 a plurality of drivers, wherein the plurality of coils arranged in series or parallel are electrically connected to one of the plurality of drivers, while remaining coils not arranged in series or parallel are divided into a plurality of groups, and a plurality of coils in each of the plurality of groups that are not arranged in series or parallel are electrically connected to the other driver in the plurality of drivers; wherein the plurality of coils arranged in series or parallel comprises MN coils, the plurality of coils in each of the plurality of groups that are not arranged in series or parallel includes N coils, the M is greater than or equal to 2, and the N is greater than or equal to 3;
 a controller electrically connected to the plurality of drivers, and the controller is configured to obtain position information of the rotor by the first position feedback unit.

As an improvement, each of the plurality of drivers is electrically connected to a corresponding coil in the plurality of coils by a first cable.

As an improvement, the rotor further comprises a conductive magnet fixed on the side of the rotor body close to the stator, there are a plurality of magnetic steels spaced from each other and fixed on a side of the conductive magnet close to the stator, and the first position feedback unit is fixed on the side of the rotor body close to the stator and is spaced from the conductive magnet.

In some embodiments, the stator further comprises two guide rails fixed on a side of the stator body close to the rotor and spaced from each other, the two guide rails are arranged along the extending direction of the stator body, and the plurality of coils are fixed on the side of the stator body close to the rotor and located between the two guide rails; the rotor further comprises two sliding blocks fixed on the side of the rotor body close to the stator and spaced apart from each other, the two sliding blocks are supported on the two guide rails, respectively, to form a sliding connection, and the conductive magnet is located between the two sliding blocks.

As an improvement, the stator further comprises a plurality of iron cores arranged in sequence and abut against each other, each of the plurality of iron cores comprises a flat portion fixed on the side of the stator body close to the rotor and a plurality of extending portions by the flat portion protruding and extending from a side of the flat portion close to the rotor in a direction towards the rotor, and the plurality of extending portions are spaced apart from each other; each of the plurality of coils is fixed to a corresponding extending portion in the plurality of extending portions, the plurality of coils arranged in series or parallel are fixed to a same iron core to form a series or parallel connection, and the plurality of coils in each of the plurality of groups that are not arranged in series or parallel are fixed to a same iron core.

As an improvement, the controller is configured to obtain the position information of the rotor by the first position feedback unit through sensorless control or variable frequency control.

As an improvement, the linear drive device further includes a plurality of second position feedback units spaced apart from each other and fixed on the side of the stator body close to the rotor, wherein the plurality of second position feedback units are electrically connected to the controller, and the plurality of second position feedback units are configured to read position information of the first position feedback unit and feedback the position information of the first position feedback unit to the controller in response to the first position feedback unit moving to align with each of the plurality of second position feedback units, to enable the controller to obtain the position information of the rotor.

As an improvement, each of the plurality of second position feedback units is electrically connected to the controller by a second cable.

As an improvement, the linear drive device further includes a signal processing module, each of the plurality of second position feedback units is electrically connected to the signal processing module by a third cable, and the signal processing module is electrically connected to the driver.

Compared with the conventional art, the linear drive device in the present disclosure arrange at least a part of coils served as the stator in series or parallel, and the multiple coils arranged in series or parallel are electrically connect to a driver, so that the coils that do not require precise control can be integrated into a module with lower requirements through series or parallel connection, and the module is driven and controlled by a high-power driver, which not only saves the number of drives to reduce the cost of the linear drive device, but also reduces the difficulty of controlling the entire control system.

BRIEF DESCRIPTION OF THE DRAWINGS

For more clearly illustrating embodiments of the present disclosure or the technical solutions in the conventional technology, drawings referred to for describing the embodiments or the conventional technology will be briefly described hereinafter. Apparently, drawings in the following description are only examples of the present disclosure, and for the person skilled in the art, other drawings may be acquired based on the provided drawings without any creative efforts.

REFERENCE SIGNS

Figure 1:
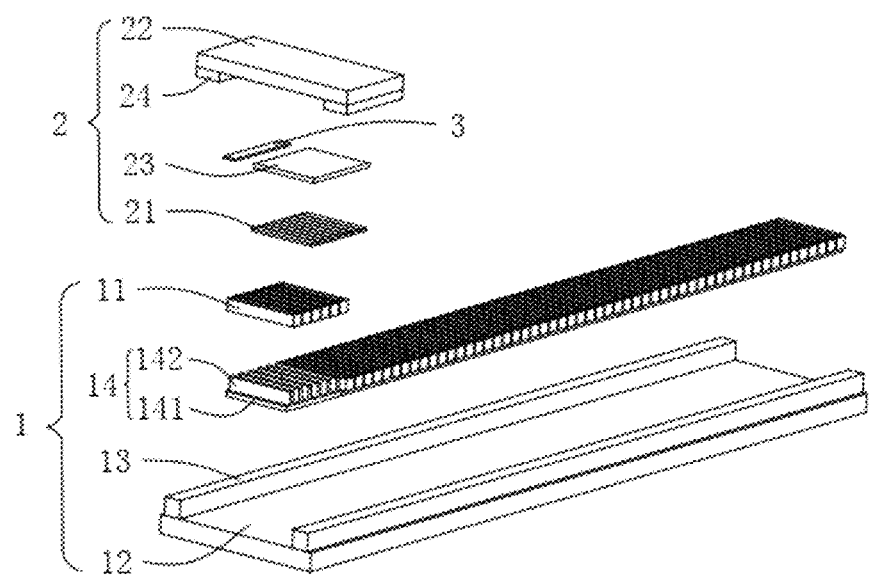
FIG. 1 is an explosive view of a first linear drive device provided according to an embodiment of the present disclosure.
Figure 2:
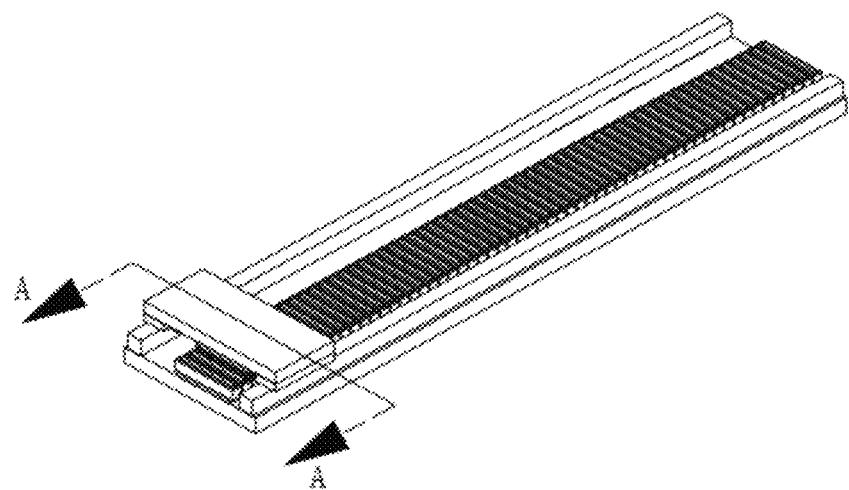
FIG. 2 is a schematic structural view of the first linear drive device provided according to an embodiment of the present disclosure.
Figure 3:
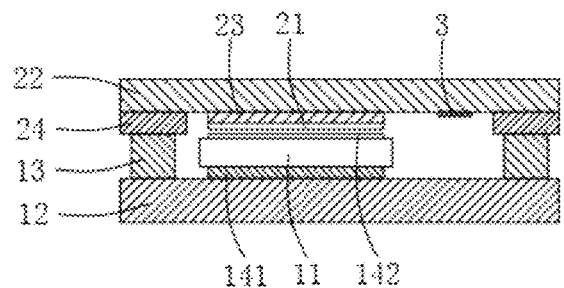
FIG. 3 is a cross-sectional view of FIG. 2 along the A-A line.

| 100 | linear drive device, | 1 | stator, |
|---|---|---|---|
| 11 | coil, | 12 | stator body, |
| 13 | guide rail, | 14 | iron core, |
| 141 | flat portion, | 142 | extending portion, |
| 2 | rotor, | 21 | magnetic steel, |
| 22 | rotor body, | 23 | conductive magnet, |
| 24 | sliding block, | 3 | first position feedback unit, |
| 4 | driver, | 41 | first cable, |
| 42 | second cable, | 5 | controller, |
| 6 | second position feedback unit. | | |

DETAILED DESCRIPTION

The technical solutions according to the embodiments of the present disclosure will be described clearly and completely as follows in conjunction with the drawings in the embodiments of the present disclosure. It should be understood that the specific embodiments described herein are only intended to explain the present disclosure and are not intended to limit the present disclosure.

A linear drive device 100 is provided according to the embodiments of the present disclosure, as shown in FIG. 1 to FIG. 6, the linear drive device 100 includes a stator 1, a rotor 2, a first position feedback unit 3, a driver 4, and a controller 5.

The stator 1 includes a stator body 12 and multiple coils 11 fixed to the stator body 12 and arranged sequentially along the extending direction of stator body 12, and at least a part of the continuously arranged coils 11 are arranged in series or parallel.

The multiple coils 11 arranged in series or parallel have electrical connection between each other, they are insulated from each of the multiple coils 11 that are not arranged in series or parallel, and the multiple coils 11 arranged in series or parallel are further insulated integratedly from the multiple coils 11 that are not arranged in series.

The rotor 2 includes a rotor body 22 supported on the stator body 12 and forming a sliding connection with the stator body 12, and a magnetic steel 21 fixed on the rotor body 22, spaced from and arranged opposite to each of the multiple coils 11.

The first position feedback unit 3 is arranged on and fixed to the side of the rotor body 22 close to the stator 1.

There are multiple drivers 4. The multiple coils 11 arranged in series or parallel are electrically connected to one of the multiple drivers 4, while remaining coils 11 not arranged in series or parallel are divided into multiple groups, and multiple coils 11 in each of the multiple groups that are not arranged in series or parallel are electrically connected to the other driver 4 in the multiple drivers 4.

The multiple coils 11 arranged in series or parallel includes MN coils 11, the multiple coils 11 in each of the plurality of groups that are not arranged in series or parallel includes N coils. The M is greater than or equal to 2, the N is greater than or equal to 3, and the M, the N are both integers.

That is, multiple coils 11 arranged in series or parallel includes at least 6 coils 11, or multiple coils 11 of integers 2 times 3 or more, or multiple coils 11 of integers 3 times 2 or more. The multiple coils 11 in each of the plurality of groups that are not arranged in series or parallel includes at least 3 coils 11.

The controller 5 is electrically connected to the multiple drivers 4 to obtain position information of the rotor 2 by the first position feedback unit 3.

In this embodiment, each of the multiple drivers 4 is electrically connected to a corresponding coil 11 by a first cable 41.

In this embodiment, the rotor 2 further includes a conductive magnet 23 fixed on the side of the rotor body 22 close to the stator 1, there are multiple magnetic steels 21 spaced from each other and fixed on a side of the conductive magnet 23 close to the stator 1, and the first position feedback unit 3 is fixed on the side of the rotor body 22 close to the stator 1 and is spaced from the conductive magnet 23, which facilitates the fixation of the magnetic steel 21 and increases the magnetic field effect formed by the multiple magnetic steels 21 and the multiple coils 11.

In this embodiment, the stator 1 further includes two guide rails 13 fixed on a side of the stator body 12 close to the rotor 2 and spaced from each other, the two guide rails 13 are arranged along the extending direction of the stator body 12, and the multiple coils 11 are fixed on the side of the stator body 12 close to the rotor 2 and located between the two guide rails 13. The rotor 2 further includes two sliding blocks 24 fixed on the side of the rotor body 22 close to the stator 1 and spaced apart from each other, the two sliding blocks 24 are supported on the two guide rails 13, respectively, to form a sliding connection, and the conductive magnet 23 is located between the two sliding blocks 24, which facilitates the rotor body 22 being slidably supported on the stator body 12, thereby improving the sliding effect between the rotor body 22 and the stator body 12.

In this embodiment, the stator 1 further includes multiple iron cores 14 arranged in sequence and abut against each other, each of the multiple iron cores 14 includes a flat portion 141 fixed on the side of the stator body 12 close to the rotor 2 and multiple extending portions 142 by the flat portion 141 protruding and extending from a side of the flat portion 141 close to the rotor 2 in a direction towards the rotor 2, and the multiple extending portions 142 are spaced apart from each other. Each of the multiple coils 11 is fixed to and sleeved on a corresponding extending portion 142 in the multiple extending portions 142, the multiple coils 142 arranged in series or parallel are fixed to a same iron core 14 to form a series or parallel connection, and the multiple coils 11 in each of the multiple groups that are not arranged in series or parallel are fixed to a same iron core 14, which facilitates the fixation and installation of the multiple coils 11, and conducive to perform series or parallel connection between the multiple coils 11.

In this embodiment, the controller 5 is configured to obtain the position information of the rotor 2 by the first position feedback unit 3 through sensorless control or variable frequency control.

In this embodiment, the multiple coils 11 that do not require precise control are integrated into a module through series or parallel connection, and the multiple coils 11 in the module are driven and controlled with a driver 4 with higher power.

The working principle of the linear drive device 100 in this embodiment is as follows. The magnetic steel 21 induces a magnetic field and generates an air gap magnetic field between the magnetic steel 21 and the coil 11. In response to a suitable current is applied to the coil 11, the coil 11 generates a traveling wave magnetic field, causing a thrust between the magnetic steel 21 and the coil 11, thereby driving the rotor 2 to slide along the stator 1.

In response to the first position feedback unit 3 on the rotor 2 passing through the corresponding area, the controller 5 operates in a non-inductive or variable frequency control manner to enable the controller 5 to cooperate with the first position feedback unit 3 to obtain the position information of the rotor 2.

Compared with the conventional art, the linear drive device 100 in the present disclosure arrange at least a part of coils 11 served as the stator 1 in series or parallel, and the multiple coils 11 arranged in series or parallel are electrically connect to a driver 4, so that the coils 11 that do not require precise control can be integrated into a module with lower requirements through series or parallel connection, and the module is driven and controlled by a high-power driver 4, which not only saves the number of drivers 4 to reduce the cost of the linear drive device 100, but also reduces the difficulty of controlling the entire control system.

Figure 4:
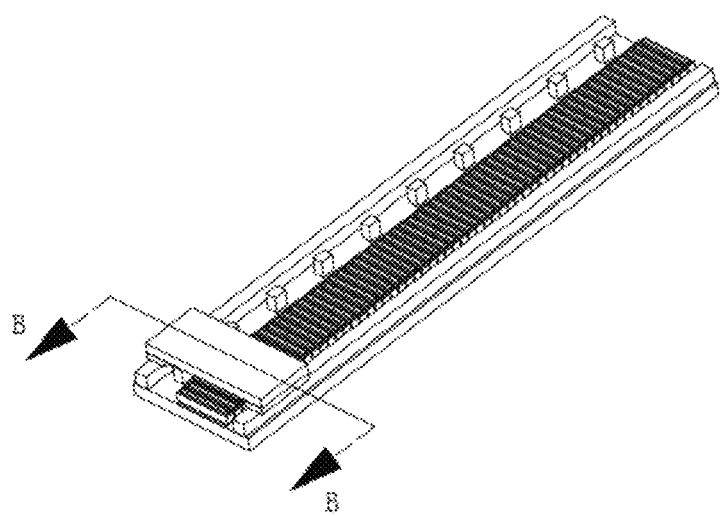
FIG. 4 is a schematic structural view of a second linear drive device provided according to an embodiment of the present disclosure.
Figure 5:
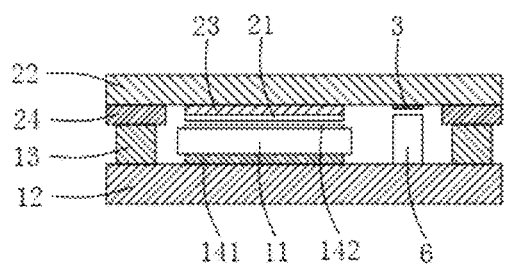
FIG. 5 is a cross-sectional view of FIG. 4 along the B-B line.
Figure 6:
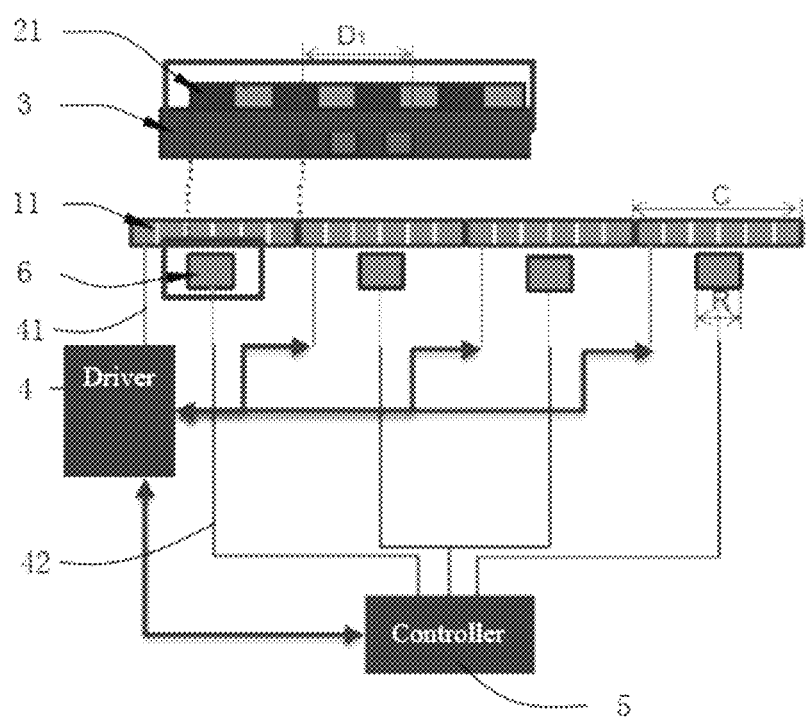
FIG. 6 is a drive control schematic view of the second linear drive device provided according to an embodiment of the present disclosure.

As another optional embodiment of the present disclosure, as shown in FIG. 4 to FIG. 6, the linear drive device 100 further includes multiple second position feedback units 6 spaced and fixed on the side of the stator body 12 close to the rotor 2. The multiple second position feedback units 6 are electrically connected to the controller 5.

The multiple second position feedback units 6 are configured to read position information of the first position feedback unit 3 and feedback the position information of the first position feedback unit 3 to the controller 5 in response to the first position feedback unit 3 moving to align with each of the multiple second position feedback units 6, to enable the controller 5 to obtain the position information of the rotor 2.

In this embodiment, the first position feedback unit 3 is a grating ruler, and each of the multiple second position feedback units 6 is a grating ruler or a reading head. The controller 5 no longer obtains the position information of the rotor 2 by reading through the second position feedback unit 6 rather than by the first position feedback unit 3 performing sensorless control or variable frequency control.

In this embodiment, each of the multiple second position feedback unit 6 is electrically connected to the controller 5 by a second cable 42.

In addition, the linear drive device 100 further includes a signal processing module (not shown in the figure). Each of the multiple second position feedback units 6 is first electrically connected to the signal processing module by a third cable, and is electrically connected to the driver 4 by the signal processing module. The signal processing module is also electrically connected to the driver 4 by the third cable.

The above is only preferred embodiments of the present disclosure and is not intended to limit the present disclosure. Any modifications, equivalent replacements, and improvements made within the spirit and principles of the present disclosure shall fall within the scope of protection of the present disclosure.

The invention claimed is:

1. A linear drive device, comprising:
   a stator, wherein the stator comprises a stator body and a plurality of coils fixed to the stator body and arranged sequentially along an extending direction of the stator body, and at least a part of the plurality of coils are arranged in series or parallel;
   a rotor, wherein the rotor comprises a rotor body supported on the stator body and forming a sliding connection with the stator body, a magnetic steel fixed on the rotor body, and the magnetic steel is spaced from and arranged opposite to the coil;
   a first position feedback unit fixed on a side of the rotor body close to the stator;
   a plurality of drivers, wherein the plurality of coils arranged in series or parallel are electrically connected to one of the plurality of drivers, while remaining coils not arranged in series or parallel are divided into a plurality of groups, and a plurality of coils in each of the plurality of groups that are not arranged in series or parallel are electrically connected to the other driver in the plurality of drivers; wherein the plurality of coils arranged in series or parallel comprises MN coils, the plurality of coils in each of the plurality of groups that are not arranged in series or parallel includes N coils, the M is greater than or equal to 2, and the N is greater than or equal to 3;
   a controller electrically connected to the plurality of drivers, and the controller is configured to obtain position information of the rotor by the first position feedback unit; wherein
   the rotor further comprises a conductive magnet fixed on the side of the rotor body close to the stator, there are a plurality of magnetic steels spaced from each other and fixed on a side of the conductive magnet close to the stator, and the first position feedback unit is fixed on the side of the rotor body close to the stator and is spaced from the conductive magnet;

the stator further comprises two guide rails fixed on a side of the stator body close to the rotor and spaced from each other, the two guide rails are arranged along the extending direction of the stator body, and the plurality of coils are fixed on the side of the stator body close to the rotor and located between the two guide rails; the rotor further comprises two sliding blocks fixed on the side of the rotor body close to the stator and spaced apart from each other, the two sliding blocks are supported on the two guide rails, respectively, to form a sliding connection, and the conductive magnet is located between the two sliding blocks;

the stator further comprises a plurality of iron cores arranged in sequence and abut against each other, each of the plurality of iron cores comprises a flat portion fixed on the side of the stator body close to the rotor and a plurality of extending portions by the flat portion protruding and extending from a side of the flat portion close to the rotor in a direction towards the rotor, and the plurality of extending portions are spaced apart from each other; each of the plurality of coils is fixed to a corresponding extending portion in the plurality of extending portions, the plurality of coils arranged in series or parallel are fixed to a same iron core to form a series or parallel connection, and the plurality of coils in each of the plurality of groups that are not arranged in series or parallel are fixed to a same iron core.

2. The linear drive device according to claim 1, wherein each of the plurality of drivers is electrically connected to a corresponding coil in the plurality of coils by a first cable.

3. The linear drive device according to claim 1, wherein the controller is configured to obtain the position information of the rotor by the first position feedback unit through sensorless control or variable frequency control.

4. The linear drive device according to claim 1, further comprising a plurality of second position feedback units spaced apart from each other and fixed on the side of the stator body close to the rotor, wherein the plurality of second position feedback units are electrically connected to the controller, and the plurality of second position feedback units are configured to read position information of the first position feedback unit and feedback the position information of the first position feedback unit to the controller in response to the first position feedback unit moving to align with each of the plurality of second position feedback units, to enable the controller to obtain the position information of the rotor.

5. The linear drive device according to claim 4, wherein each of the plurality of second position feedback units is electrically connected to the controller by a second cable.

6. The linear drive device according to claim 4, further comprising a signal processing module, each of the plurality of second position feedback units is electrically connected to the signal processing module by a third cable, and the signal processing module is electrically connected to the driver.

* * * * *